United States Patent

Koenig et al.

[11] Patent Number: 5,228,365
[45] Date of Patent: Jul. 20, 1993

[54] ELECTRONIC RANGE SELECTION APPARATUS FOR A VEHICULAR AUTOMATIC TRANSMISSION

[75] Inventors: Melissa M. Koenig, Ann Arbor; William J. Vukovich, Ypsilanti, both of Mich.

[73] Assignee: General Motors Corporation, Detroit, Mich.

[21] Appl. No.: 712,367

[22] Filed: Jun. 10, 1991

[51] Int. Cl.⁵ ............................................ B60K 41/06
[52] U.S. Cl. .................................... 74/866; 74/867; 74/868; 74/869; 364/424.1; 475/123
[58] Field of Search ................. 74/866, 867, 868, 869; 475/121, 122, 123, 144; 364/424.1

[56] References Cited

U.S. PATENT DOCUMENTS

| | | | |
|---|---|---|---|
| 3,724,292 | 4/1973 | Borman | 74/869 X |
| 4,034,627 | 7/1977 | Mizote | 475/123 X |
| 4,094,211 | 6/1978 | Espenschied | 74/868 |
| 4,208,929 | 6/1980 | Heino et al. | 74/731 |
| 4,425,620 | 1/1984 | Batcheller et al. | 364/424.1 |
| 4,468,987 | 9/1984 | Miller | 74/869 X |
| 4,485,695 | 12/1984 | Kawamoto | 74/868 X |
| 4,583,171 | 4/1986 | Hara et al. | 364/424.1 |
| 4,602,529 | 7/1986 | Sugano | 74/869 |
| 4,680,992 | 7/1987 | Hayasaki et al. | 74/866 X |
| 4,691,597 | 9/1987 | Leorat et al. | 74/869 |
| 4,753,134 | 6/1988 | Hayasaki | 74/866 |
| 4,791,568 | 12/1988 | Hiramatsu et al. | 74/867 X |
| 4,807,496 | 2/1989 | Hayasaki et al. | 74/866 |
| 4,926,328 | 5/1990 | Funatsu et al. | 74/866 X |
| 4,932,282 | 6/1990 | Arisumi | 74/867 |
| 4,957,015 | 9/1990 | Ishikawa et al. | 74/867 X |
| 5,005,443 | 4/1991 | Sugano | 74/868 X |
| 5,016,175 | 5/1991 | Baltusis et al. | 74/866 X |
| 5,016,496 | 5/1991 | Sugano | 74/868 X |
| 5,020,393 | 6/1991 | Kuwayama et al. | 74/868 X |
| 5,033,330 | 7/1991 | Okahara | 74/866 X |
| 5,069,085 | 12/1991 | Iizuka | 74/866 |
| 5,090,271 | 2/1992 | Hayasaki | 74/866 X |
| 5,097,723 | 3/1992 | Hayasaki | 74/866 |

Primary Examiner—Leslie A. Braun
Assistant Examiner—David E. Henn
Attorney, Agent, or Firm—Mark A. Navarre

[57] ABSTRACT

A transmission range selection apparatus including electrically activated range selection valving elements for selectively defining fluid supply states for each primary operating mode of the transmission. Two electrically operated valving elements selectively define fluid supply states for each of four operating modes: Park/Neutral, Reverse, Drive and Drive/Braking. These four operating modes, in conjunction with electronic positioning of the transmission shift valves enables automatic selection of any operating mode of the transmission by a state-of-the-art electronic control unit.

5 Claims, 3 Drawing Sheets

| GEAR | PRESSURE A B C D | IC 62 | 2C 60 | 3C 64 | 4C 70 | 1-2B 72 | FB 74 | RB 76 |
|---|---|---|---|---|---|---|---|---|
| P/N | --00 | ON | | | | | | |
| R | --10 | ON | | | | | | ON |
| 1 | 1101 | ON | | | | | ON | |
| 1B | 1111 | ON | | ON | | ON | (ON) | |
| 2 | 0101 | (ON) | ON | | | | ON | |
| 2B | 0111 | (ON) | ON | | | ON | ON | |
| 3 | 0001 | OFF | ON | ON | | | (ON) | |
| 3B | 0011 | ON | ON | ON | | | (ON) | |
| 4B | 1001 | OFF | ON | (ON) | ON | | (ON) | |

FIG. 2

| | PRESSURE C | PRESSURE D | D4 | PRN | REV | DR-B |
|---|---|---|---|---|---|---|
| NEUTRAL | 0 | 0 | 0 | 1 | 0 | 0 |
| DRIVE | 0 | 1 | 1 | 0 | 0 | 0 |
| REVERSE | 1 | 0 | 0 | 1 | 1 | 0 |
| DRIVE-BRAKING | 1 | 1 | 1 | 0 | 0 | 1 |

FIG. 3

ELECTRONIC RANGE SELECTION APPARATUS FOR A VEHICULAR AUTOMATIC TRANSMISSION

This invention relates to range selection in vehicular automatic transmissions, and more particularly, to an electronically activated range selector apparatus.

BACKGROUND OF THE INVENTION

Automatic transmission vehicles are generally provided with an operator manipulated range selector, whereby the operator selects one of a number of transmission ranges including Park, Reverse, Neutral, Drive and one or more Manual Lo ranges. The Manual Lo ranges are used to limit the uppermost available speed ratio (gear), and in most cases, to provide engine braking. In conventional practice, the range selector is physically coupled to the transmission through a suitable mechanical or electro-mechanical linkage, where it operates to position a linearly displaceable hydraulic valve, commonly referred to as a Manual Valve. Although linearly displaceable, the Manual Valve is provided with a number of discrete positions corresponding to the various positions of the range selector and operates to develop fluid range or supply pressures within a hydraulic valve body of the transmission for enabling the range selected by the operator.

In normal usage, the term "range pressure" refers to the working fluid pressure distributed to the various hydraulic control elements (shift valves, e.g.) of the transmission. As noted above, this is conventionally accomplished with the Manual Valve based on the position of the range selector. For example, if the range selector is positioned to the Reverse sector, the Reverse range pressure circuit of the transmission is pressurized to engage the Reverse clutch or brake. If the range selector is positioned to the Drive sector, the Drive range pressure circuit is pressurized to enable engagement of any of the forward drive ranges; in this case the engagement of a selected clutch or brake is carried out by one or more shift valves to which the Drive range pressure is supplied. The range pressure within a transmission may therefore be considered as a range-dependent supply pressure to be used for the engagement of selected fluid operated clutches or brakes. This is in contrast to the clutch apply pressure, which varies with the operation of the various hydraulic pressure control elements.

Although simple in concept, the above-described arrangement presents various drawbacks pertaining to installation and packaging. The linkage, which is factory adjusted at the time of installation to ensure proper alignment among the range selector, Manual Valve and a range indicator, is subject to subsequent misadjustment by untrained service personnel. Packaging concerns pertain primarily to the routing of the linkage mechanism to the transmission.

More significantly, however, the conventional range selector apparatus is custom designed and limits the flexibility of transmission control. For example, if the manufacturer wishes to provide engine braking in certain ranges for a particular application, the Manual Valve must be specifically tailored to route fluid range pressure to the appropriate hydraulic elements. Each application requires a custom design and an application specific set of parts for installation into the transmission.

In addition, it may be desirable to automatically alter the fluid range pressure routing at will, depending on the vehicle operating conditions. For example, it would be desirable to selectively utilize engine braking or to override the manual selector position under certain conditions.

SUMMARY OF THE PRESENT INVENTION

The present invention is directed to an improved range selection apparatus including electrically activated range selection valving elements disposed in the transmission valve body for selectively defining range pressures for each primary operating mode of the transmission. In the illustrated embodiment, there are two electrically operated valving elements for selectively defining range pressures for each of four operating modes: Park/Neutral, Reverse, Drive and Drive/Braking. The range pressures are directed to the appropriate fluid operated friction devices through a hydraulic control apparatus for establishing the selected operating mode, thereby enabling remote and automatic selection of any operating mode of the transmission by a state-of-the-art electronic control unit.

The above-described apparatus not only eliminates the design and packaging drawbacks associated with conventional linkage mechanisms, but permits flexible control of the transmission operating mode. By way of example, the subject apparatus conveniently enables selective engine braking, transmission protection during abusive operation of the vehicle, Neutral-idle controls, Reverse lock-out, shift interlock and many other desirable control functions.

BRIEF DESCRIPTION OF THE DRAWINGS

FIG. 2 is a chart illustrating the various operating modes of the transmission depicted in FIGS. 1a-1b.

FIG. 3 is a truth table depicting the transmission operating modes and hydraulic pressures which can be selected by the range selection apparatus depicted in FIG. 1b.

DETAILED DESCRIPTION OF THE INVENTION

Figure 1A:
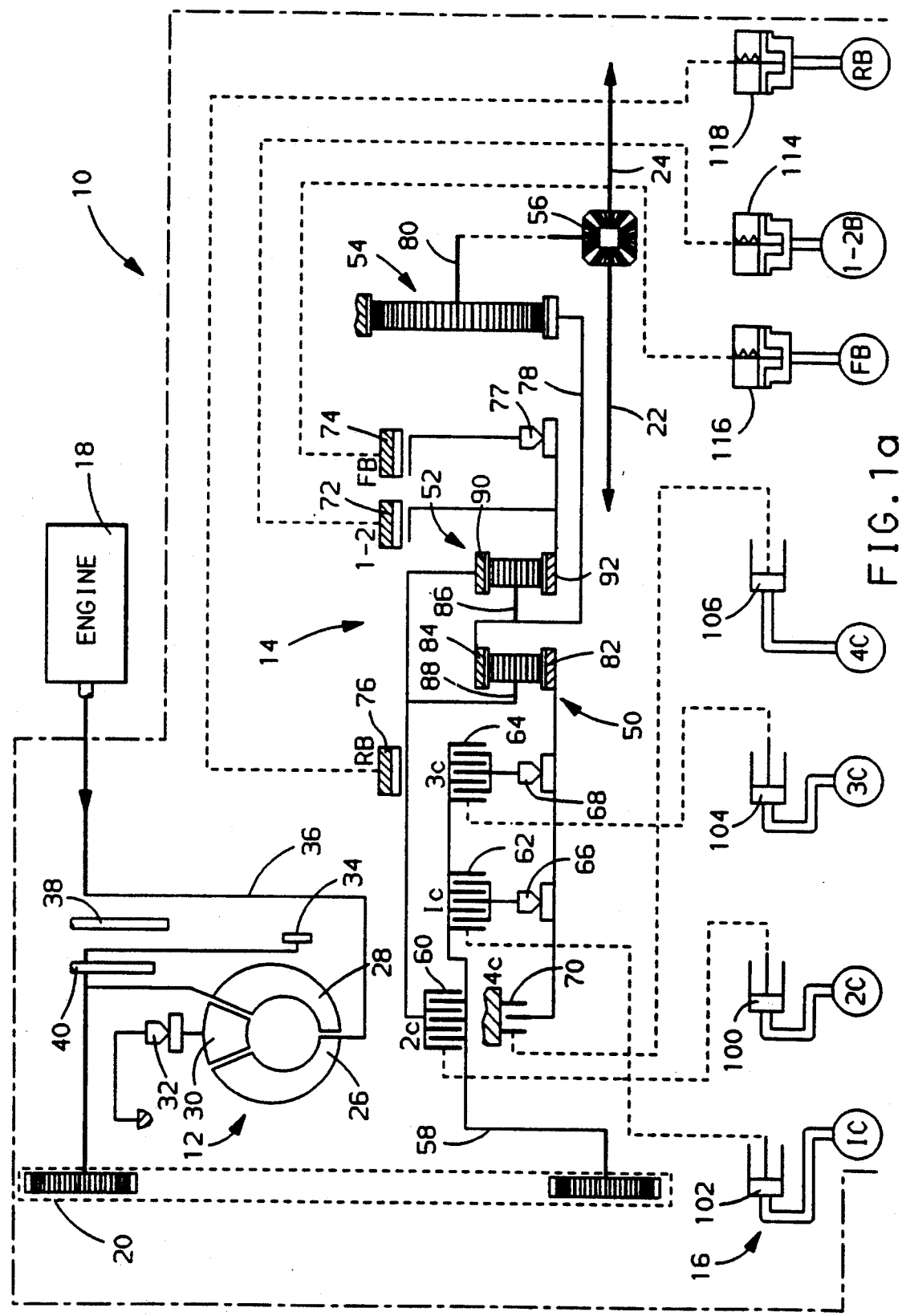
FIGS. 1a-1b depict a vehicular four-speed automatic transmission according to this invention, including electrically activated range selection apparatus and shift valves operated by a computer-based electronic control unit.
Figure 1B:
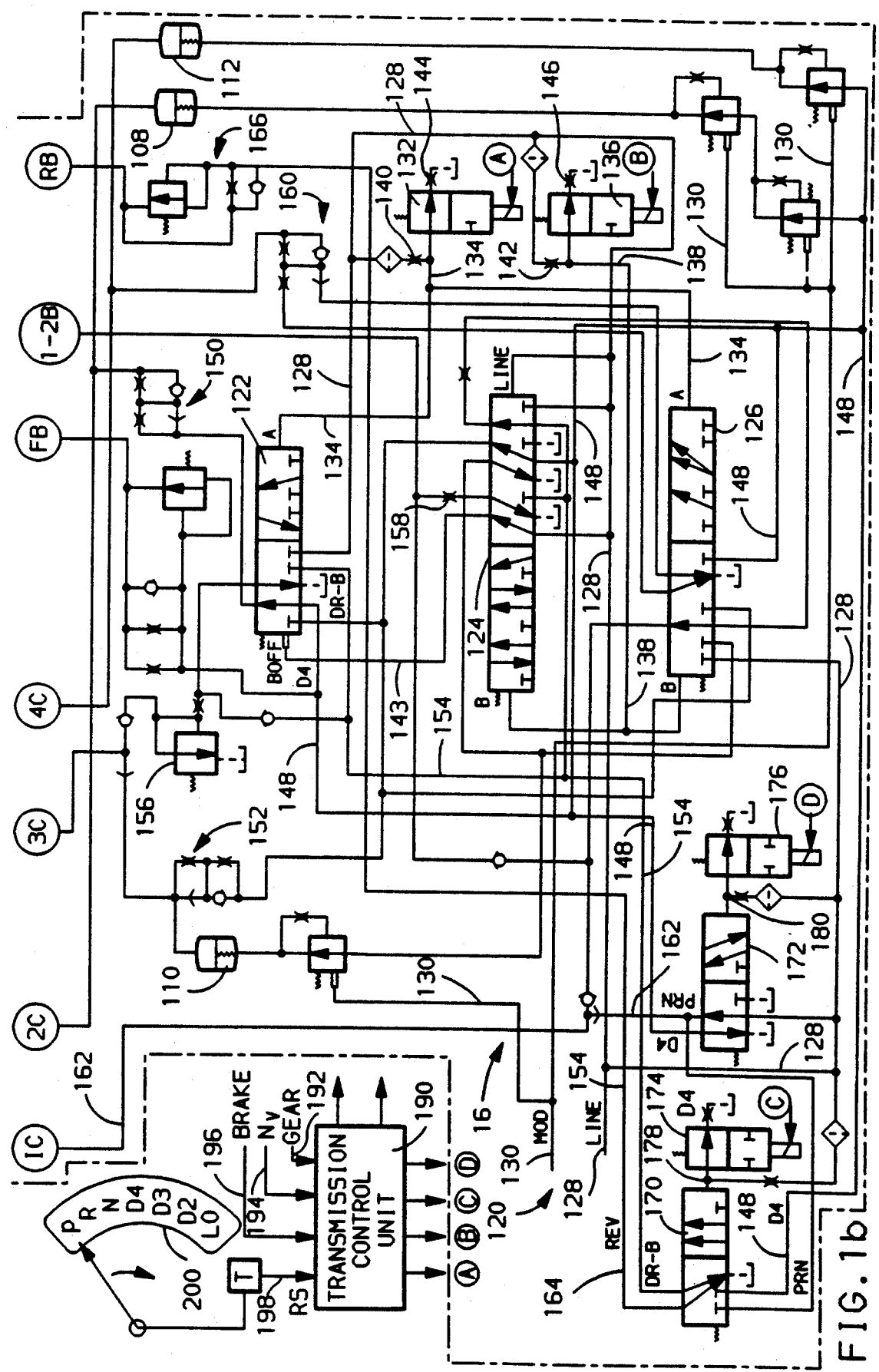

Referring particularly to FIGS. 1a-1b, the reference numeral 10 generally designates a vehicular four-speed automatic transmission including a fluidic torque converter 12, mechanical gearset elements 14 and hydraulic control elements 16. The torque converter 12 is adapted to variably transmit a rotary output of engine 18 to gearset elements 14 via chain drive mechanism 20. The final drive shafts 22, 24 of gearset elements 14 are connected to drive a pair of vehicle wheels, not shown.

The torque converter 12 comprises the conventional elements of an impeller 26 connected to the engine 18, a turbine 28 connected to the chain drive mechanism 20, and a stator 30 grounded to the transmission case through a one-way device 32. A torque converter clutch 34 disposed between the turbine 28 and input shell 36 is selectively controlled to mechanically couple the impeller 26 and turbine 28. The state of the clutch 34 is controlled by the supply of fluid to torque converter 12. When fluid is supplied via line 38, the fluid pressure separates clutch 34 from input shell 36 to establish the usual open-converter mode of operation. When fluid is supplied via line 40, the clutch 34 engages the input shell 36 to mechanically couple the impeller 26 and turbine 28. A conventional valving arrangement (not shown) controls the fluid supply to torque converter 12 to establish the appropriate operating mode, depending on various vehicle operating conditions.

The gearset elements 14 comprise front and rear simple planetary gearsets 50, 52, a final drive gearset 54 and a differential gearset 56. The gearset input shaft 58 is selectively coupled to the front and rear gearsets 50, 52 via the friction clutches 60, 62, 64 and the one-way devices 66, 68. Friction brake 70, band brakes 72, 74, 76 and one-way device 77 operate to selectively brake certain elements of the front and rear gearsets 50, 52. The output shaft 78 of front and rear gearsets 50, 52 is connected as an input to final drive gearset 54, the output shaft 80 of which, in turn, provides an input to differential gearset 56.

As described below, the hydraulic control elements 16 control the engagement and disengagement of the various friction clutches 60, 62, 64, 70, 72, 74, 76 to establish Park/Neutral, Forward or Reverse drive conditions between input shaft 58 and gearset output shaft 78. In the Forward drive condition, one of four forward speed ranges may be selected.

Referring to the range chart of FIG. 2, it will be seen that in the Park/Neutral drive condition, the input clutch (IC) 62 is engaged to connect input shaft 58 with the sun 82 of front gearset 50 via one-way device 66. Since the front ring 84 and rear carrier 86 are restrained by the weight of the vehicle, the front carrier 88, rear ring 90 and rear sun 92 are permitted to rotate.

To establish the Reverse (R) drive condition, the reverse band (REV BAND) 76 is also engaged to brake the front carrier 88. In this case, forward rotation of the sun 82 by engine 18 drives the ring 84, and thus the gearset output shaft 78 in a reverse direction at a reduction speed ratio.

To establish the first (1) or lowest output-to-input speed ratio forward drive connection, the forward band (FB) 74 is engaged along with the input clutch 62. In this case, the front carrier 88 drives the rear ring 90, rear carrier 86 and front ring 84, and thus output shaft 78, in a forward direction at a reduction speed ratio determined by the front and rear gearsets 50, 52. In this state, engine braking (designated 1B in the chart of FIG. 2) may be achieved by additionally engaging third clutch (3C) 64 and band (1-2B) 72 to override the operation of one-way devices 66 and 77, and to transmit drive wheel torque to input shaft 58 via one-way device 68. Due to the engagement of band 72, the engagement of forward band 74 is optional in the engine braking mode.

To establish the second (2) forward speed ratio, the second clutch (2C) 60 is engaged along with the forward band (FB) 74. This drives the rear ring 90 at input speed, and since the rear sun is held by forward band 74 and one-way device 77, the output shaft 78 is rotated in a forward direction at a reduction speed ratio determined by the rear gearset 52. In this state, engine braking (2B) may be achieved by additionally engaging band 72 to override the operation of one-way device 77, the drive wheel torque being transmitted to input shaft 58 via second clutch 60. In either of the driving or braking modes, the engagement of input clutch 62 is optional, as the one-way device 66 will overrun.

To establish the third (3) or direct forward speed ratio, the third clutch 64 is engaged along with the second clutch 60. This locks up both front and rear gearsets 50, 52, driving output shaft 78 in unison with input shaft 58. If input clutch 62 is disengaged, one-way device 68 will overrun so that no engine braking is provided. However, if input clutch 62 is engaged, the one-way device 66 will transmit drive wheel torque to input shaft 58 to provide engine braking (3B). In either of the driving or braking modes, the engagement of forward band 74 is optional, as the one-way device 77 will overrun.

To establish the fourth (4) or overdrive forward speed ratio, the fourth clutch (4C) 70 is engaged along with the second clutch 60. This drives the front carrier 88 at input speed while braking the front sun 82, thereby rotating the front ring, and hence, output shaft 78, in a forward direction at an overdrive speed ratio determined by the front gearset 50. The engagement of third clutch 64 and band 74 is optional, as the one-way devices 68 and 77, respectively, will overrun. Engine braking is always available in the overdrive speed ratio.

Engagement of each friction clutch 60, 62, 64 and 70 is achieved by supplying fluid to a respective power cylinder 100, 102, 104 and 106. In the case of clutches 60, 64 and 70, hydraulic accumulators 108, 110 and 112, respectively, are provided to cushion the engagement. Similarly, engagement of each band brake 72, 74 and 76 is achieved by supplying fluid to a respective band apply servo 114, 116 and 118. In this case, the servo operates as an accumulator to cushion the band engagement.

The hydraulic elements 16 which control the supply of fluid to the various power cylinders 100–106 and servos 114–118 depicted in FIG. 1b, principally comprise an electrically activated fluid pressure supply circuit 120 and three electrically activated shift valves 122, 124 and 126. Line pressure (LINE) developed on line 128 by a suitable pump and pressure regulating circuit (not shown) is supplied to each of the above elements. An input torque-related pressure signal (MOD) is developed on line 130 as a bias pressure.

The shift valve 122, referred to as the 1-2 shift valve, controls shifting between the first and second forward speed ratios. The shift valve 124, referred to as the 2-3 shift valve, controls shifting between the second and third forward speed ratios. The shift valve 126, referred to as the 3-4 shift valve, controls shifting between the third and fourth forward speed ratios.

The shift valves 122, 124 and 126 are each biased to ON or OFF states by the combination of a spring bias and two or more hydraulic bias pressures as shown. When activated, solenoid 132 develops a first bias pressure (A) on line 134, and solenoid 136 develops a second bias pressure (B) on line 138, both pressures being lower than line pressure due to the operation of orifices 140 and 142. An additional bias pressure (B-OFF) substantially equal to line pressure is developed by shift valve 124 in line 143 when solenoid 136 is deactivated.

The shift valve 122 is biased to the illustrated state except when bias pressures A and B are both present. The shift valve 124 is biased to the illustrated state except when bias pressure B is not present. The shift valve 126 is biased to the illustrated state except when only bias pressure A is present.

In FIG. 1b, both solenoids 132 and 136 are depicted in the spring biased (deactivated) state in which the bias pressures A and B are exhausted through orifices 144 and 146, respectively. As indicated by the solenoid state chart of FIG. 2, the third forward gear is established in this condition. In this state, the range pressure D4 on line 148 is supplied to power cylinder 100 for second clutch 60 via shift valve 122 and orifice network 150, and to power cylinder 104 for third clutch 64 via shift valve 124 and orifice network 152. As with all other forward gears, range pressure D4 is also supplied to the servo 116 for engaging the forward band brake 74. The engine braking range pressure DR-B on line 154, when present, is supplied to power cylinder 102 for input clutch 62 via shift valves 124 and 126 to provide engine braking, as described above.

The second forward gear is established by activating solenoid 136 to generate bias pressure B. In this state, the power cylinder 104 for third clutch 64 is exhausted via shift valve 124, and line pressure in line 128 is supplied to power cylinder 102 for input clutch 62 via shift valves 124 and 126. The engine braking range pressure DR-B on line 154, when present, is supplied to servo 114 for band brake 72 via shift valve 124 to provide engine braking as described above.

The first forward gear is established by activating both solenoids 132 and 136 to generate bias pressures A and B. In this state, the power cylinder 100 for second clutch 60 is exhausted via shift valves 122 and 124. The engine braking range pressure DR-B on line 154, when present, is supplied (1) to power cylinder 104 for third clutch 64 via shift valve 122 and limiting valve 156, and (2) to servo 114 for band brake 72 via shift valve 124 and orifice 158 to provide engine braking as described above.

Finally, the fourth forward gear is established by activating solenoid 132 to generate bias pressure A. In this state, the range pressure D4 on line 148 is supplied (1) to power cylinder 100 for second clutch 60 via shift valve 122 and orifice network 150; (2) to power cylinder 104 for third clutch 64 via shift valve 124 and orifice network 152; and (3) to power cylinder 106 for fourth clutch 70 via shift valves 124, 126 and orifice network 160. As indicated above, engine braking is always available in fourth gear.

The pressure supply circuit 120, the principle subject of this invention, comprises first and second range pressure valves 170 and 172 for selectively developing four different combinations of the range pressures D4, PRN, REV and DR-B. Each of the valves 170, 172 is controlled by the combination of a spring bias and an opposing hydraulic bias pressure developed by a respective solenoid operated valve 174 and 176. When solenoid 174 is activated, the bias pressure (C) developed in line 178 changes the state of range pressure valve 170. Likewise, when solenoid 176 is activated, the bias pressure (D) developed in line 180 changes the state of range pressure valve 172.

Line pressure in line 128 is supplied as an input to range pressure valve 172. In the default state shown in FIG. 1b (solenoid 176 deactivated), the Forward range pressure (D4) line 148 is exhausted and the Park/Reverse/Neutral range pressure (PRN) line 162 is connected to line pressure. In the activated state (solenoid 176 activated), the D4 pressure line 148 is connected to line pressure, and the PRN pressure line 162 is exhausted.

The PRN and D4 range pressure lines 162 and 148 are supplied as inputs to range pressure valve 170. In the default state shown in FIG. 1b (solenoid 174 deactivated), both the Reverse range pressure (REV) and the Engine Braking range pressure (DR-B) in lines 164 and 154, respectively, are exhausted. In the activated state (solenoid 174 activated), the REV pressure line 164 is connected to the PRN pressure line 162 and the DR-B pressure line 154 is connected to the D4 pressure line 148.

The above-described operation is set forth in the truth table of FIG. 3 for each combination of solenoid activation. Thus, when neither pressures C nor D are present, only the range pressure PRN is developed. This corresponds to the Neutral mode of operation of the transmission 10. When only pressure D is present, only the range pressure D4 is developed. This corresponds to the Drive mode of operation without engine braking. When only pressure C is present, the range pressures PRN and REV are developed. This corresponds to the Reverse mode of operation, and PRN pressure is supplied to (1) power cylinder 102 for input clutch 62, and (2) servo 118 for band brake 76 via orifice network 166. When both pressures C and D are present, the range pressures D4 and DR-B are developed. This corresponds to the Drive mode of operation with engine braking.

With the illustrated embodiment, it is thus seen that any possible operating condition of the transmission 10 may be remotely invoked through suitable activation of the solenoids 132, 136, 174 and 176. As indicated in FIG. 1b, the activation of these solenoids is controlled by a computer-based Transmission Control Unit 190, which may also control other electrically activated transmission elements, including a torque converter clutch control valve (not shown) and a line pressure control valve (also not shown). In the illustrated embodiment, the control unit 190 activates the solenoids 132, 136, 174 and 176 (as indicated by the circled numerals A, B, C and D) in response to various inputs, including an actual gear indication (GEAR) on line 192, a vehicle speed (Nv) indication on line 194, a service brake indication (BRAKE) on line 196, and a range selector position indication on line 198. The input indications may be obtained with conventional transducer technology, such as the transducer T which is responsive to the position of an operator manipulated range selector 200.

The control unit 190 may implement various control strategies regarding the activation of fluid pressure supply circuit 120. At the most basic level, the solenoids 174 and 176 may be selectively activated to provide an application-specific engine braking schedule. For example, it may be desired to provide only fourth gear engine braking in the D4 position, second and third gear braking in the D3 position, and first and second gear braking in the D2 position. If a different engine braking schedule is desired, only a control unit software change is required. On a slightly more advanced level, the control unit 190 may engage engine braking in the D4 position whenever the vehicle service brakes are in use, or in response to the activation of a driver-manipulated switch.

Furthermore, the fluid pressure supply circuit 120 may be used to prevent initial engagement of the Forward or Reverse speed ranges under specified operating conditions, such as engine speed less than a certain value, or service brakes applied. Engagement of the Reverse range may be inhibited when a forward vehicle speed in excess of a certain value is detected. When combined with electronic control of transmission shifting, as in the illustrated embodiment, the control possibilities are further enhanced since nearly any operating mode of the transmission may then be remotely activated by control unit 190.

While this invention is depicted in reference to the illustrated embodiment, it is expected that various modifications will occur to those skilled in the art, and it should be understood in this regard that systems incorporating such modifications may fall within the scope of this invention, which is defined by the appended claims.

The embodiments of the invention in which an exclusive property or privilege is claimed are defined as follows:

1. Control apparatus for an automatic transmission having a plurality of fluid operated friction devices engageable according to a predefined pattern to establish various forward speed ratios between a vehicle engine and drive wheel, selectively with and without engine braking, the control apparatus comprising:

first electrically activated fluid pressure means for developing a first range pressure whenever operation in any of said forward speed ratios is desired;

second electrically activated fluid pressure means for developing a second range pressure when engine braking in a selected forward speed ratio is desired; and control means including at least one shift valve for directing the first range pressure to the fluid operated friction devices required to establish the selected forward speed ratio without engine braking, and for directing the second range pressure to the fluid operated friction devices required to provide engine braking in the selected forward speed ratio.

2. The control apparatus set forth in claim 1, wherein:

said first electrically activated fluid pressure means includes a first valve for forming said first range pressure from a transmission line pressure whenever operation in any of said forward speed ratios is desired; and said second electrically activated fluid pressure means includes a second valve for forming said second range pressure from said first range pressure when engine braking in said selected forward speed ratio is desired.

3. The control apparatus set forth in claim 1, including:

electronic control means for activating said first and second electrically activated fluid pressure means in accordance with specified operating parameters of said vehicle.

4. Control apparatus for an automatic transmission connected between a vehicle engine and drive wheel, the transmission having a plurality of fluid operated friction devices engageable according to a predefined pattern to selectively establish a Neutral operating mode, a Reverse operating mode, and a Drive operating mode, the Drive operating mode defining multiple alternately engageable forward speed ratios, selectively with and without engine braking, through selective engagement of at least one friction device, the control apparatus comprising:

first and second electrically energizable valving means for defining fluid range pressures unique to a selected transmission operating mode;

hydraulic control means for directing said fluid range pressures to the fluid operated friction devices required to establish the selected transmission operating mode; and electronic control means for activating said first and second electrically energizable valving means in accordance with specified operating parameters of said vehicle.

5. The control apparatus set forth in claim 4, wherein:

said first electrically energizable fluid pressure means is effective when deenergized to activate a first range pressure for said Neutral and Reverse operating modes, and when energized to activate a second range pressure for said Drive operating mode without braking; and said second electrically energizable fluid pressure means is effective when energized to form a third range pressure for said Reverse operating mode if said first range pressure is activated, and form a fourth range pressure for said Drive operating mode, with engine braking, if said second range pressure is activated.

* * * * *